(12) United States Patent
Altmayer et al.

(10) Patent No.: US 6,473,821 B1
(45) Date of Patent: Oct. 29, 2002

(54) MULTIPLE PROCESSOR INTERFACE, SYNCHRONIZATION, AND ARBITRATION SCHEME USING TIME MULTIPLEXED SHARED MEMORY FOR REAL TIME SYSTEMS

(75) Inventors: Terry Robert Altmayer, Monument, CO (US); James Alfred Wargnier, Chesterfield, MI (US); Christopher John Hagan, Colorado Springs, CO (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/468,144

(22) Filed: Dec. 21, 1999

(51) Int. Cl.$^7$ ................................................ G06F 12/00
(52) U.S. Cl. ........................ 710/240; 710/309; 711/147
(58) Field of Search ................................. 710/100, 107, 710/240, 111, 309, 316, 317, 28, 40, 41, 57, 45; 711/100, 147, 150, 151, 167, 168

(56) References Cited

U.S. PATENT DOCUMENTS

| | | | |
|---|---|---|---|
| 4,495,567 A | 1/1985 | Treen | |
| 4,536,839 A | 8/1985 | Shah et al. | |
| 4,682,282 A | 7/1987 | Beasley | |
| 4,780,812 A | 10/1988 | Freestone et al. | |
| 4,809,217 A | * 2/1989 | Floro et al. | 710/52 |
| 4,894,769 A | 1/1990 | Conforti | |
| 5,047,921 A | 9/1991 | Kinter et al. | |
| 5,193,193 A | 3/1993 | Iyer | |
| 5,255,373 A | 10/1993 | Brockmann et al. | |
| 5,261,109 A | 11/1993 | Cadambi et al. | |
| 5,333,297 A | * 7/1994 | Lemaire et al. | 710/200 |
| 5,408,629 A | * 4/1995 | Tsuchiya et al. | 711/148 |
| 5,463,486 A | * 10/1995 | Stevens | 359/117 |
| 5,586,331 A | * 12/1996 | Levenstein | 710/200 |
| 5,761,731 A | * 6/1998 | Van Doren et al. | 711/145 |
| 6,163,831 A | * 12/2000 | Kermani | 710/244 |
| 6,266,751 B1 | * 7/2001 | Niescier | 711/147 |
| 6,401,176 B1 | * 6/2002 | Fadavi-Ardekani et al. | 710/240 |

* cited by examiner

Primary Examiner—Xuan M. Thai
(74) Attorney, Agent, or Firm—Brooks & Kushman P.C.

(57) ABSTRACT

An arbitration and synchronization method and system for allowing multiple processors to access a shared memory includes an arbitrator. The arbitrator is operable with the processors for enabling each of the processors exclusive access to the memory for a predetermined time period on a rotating basis. In operation, a time period of a time frame is associated with each of the processors. The time periods of the time frame are then counted. The arbitrator then enables a processor to have exclusive access to the shared memory for the time period associated with the processor when the counted time period is the time period associated with the processor.

9 Claims, 2 Drawing Sheets

MULTIPLE PROCESSOR INTERFACE, SYNCHRONIZATION, AND ARBITRATION SCHEME USING TIME MULTIPLEXED SHARED MEMORY FOR REAL TIME SYSTEMS

TECHNICAL FIELD

The present invention relates to data processing computer systems and, more particularly, to an arbitration method and system for allowing multiple processors to access a shared memory in which each processor is allotted a fixed amount of time on a rotating basis to access the shared memory.

BACKGROUND ART

When processing is divided among multiple processors, a mechanism must be in place to allow communication between the processors to transfer data back and forth to memory. There is an inherent tradeoff when developing the architecture between a maximally flexible interface (fully connected network) and an area efficient interface (shared memory bus) or an intermediate solution.

Processors with a common address space (shared memory) offer a single memory address space which multiple processors can share. Communication is performed by writing and reading shared variables through this memory where any processor can access any variable or memory location.

The access of the shared memory must also be synchronized so that one processor cannot start working on data before another processor is finished working on the data, and so that multiple processors do not attempt to access the memory at the same time. A bus arbitrator performs the synchronization. A bus arbitrator is a controller which defines what processor may have access to the bus at any given time. When multiple processors attempt to access the bus concurrently, one processor is granted access to the bus while the other processors must wait for the bus to be released. Attempting to assign priority to different processors while ensuring that a low priority processor is not locked out or subject to unreasonable delays in accessing the bus can lead to very complex bus arbitration schemes.

Processors may also use message sending for communication where dedicated links exist between processing nodes. In the extreme case, a fully connected network offers a dedicated communication link between each processing node with a much higher performance and enormous cost in juxtaposition to the low performance and low cost of the bus approach. Because of the dedicated links there is no need for an arbitrator to select if one processor should wait while another processor is granted access.

Other network topologies exist that connect together subsets of nodes with mid range performance and cost. In cases where a less than fully connected network is used there is the possibility that a message sent between processors will have to go through one or more intermediate nodes to arrive at its intended destination. This results in a variable amount of delay to complete the communication, and the need for arbitration because a decision is required to determine whether data at an intermediate node should be passed along or whether the data of the processor should be sent.

A complication exists for real time processing in that a fixed amount of processing or a processing task must be accomplished within a specified amount of time or number of clock cycles. The program must insure that the longest path through the code will always be completed within the required time period. A typical shared memory/bus approach or a network which is not fully connected makes ensuring this difficult because of the arbitration which occurs and causes processors to wait for some unknown amount of time to access a bus. While waiting, processors are typically forced to suspend processing and execute wait states leading to uncertainty in how long it takes in the worst case to complete the processing tasks.

What is needed is a low cost shared memory and bus approach for multiple processors to access a shared memory which avoids the need for a complex arbitrator or the injection of wait states.

DISCLOSURE OF INVENTION

It is an object of the present invention to provide an arbitration method and system for allowing multiple processors to access a shared memory in which each processor is allotted a fixed amount of time on a rotating basis to access the shared memory.

Accordingly, the present invention provides a data processing system having a memory, multiple processors, and an arbitrator. Each of the processors is operable with the memory for accessing the memory. The arbitrator is operable with the processors for enabling each of the processors exclusive access to the memory for a predetermined time period on a rotating basis.

Further according to the present invention, there is provided a method for enabling a plurality of processors access to shared memory. The method includes associating a time period of a time frame with each of the processors. The time periods of the time frame are then counted. A processor is then enabled to have exclusive access to the shared memory for the time period associated with the processor when the counted time period is the time period associated with the processor.

BRIEF DESCRIPTION OF DRAWINGS

The present invention will now be described in further detail, and by way of example, with reference to the accompanying drawings, in which.

BEST MODE FOR CARRYING OUT THE INVENTION

Figure 1:
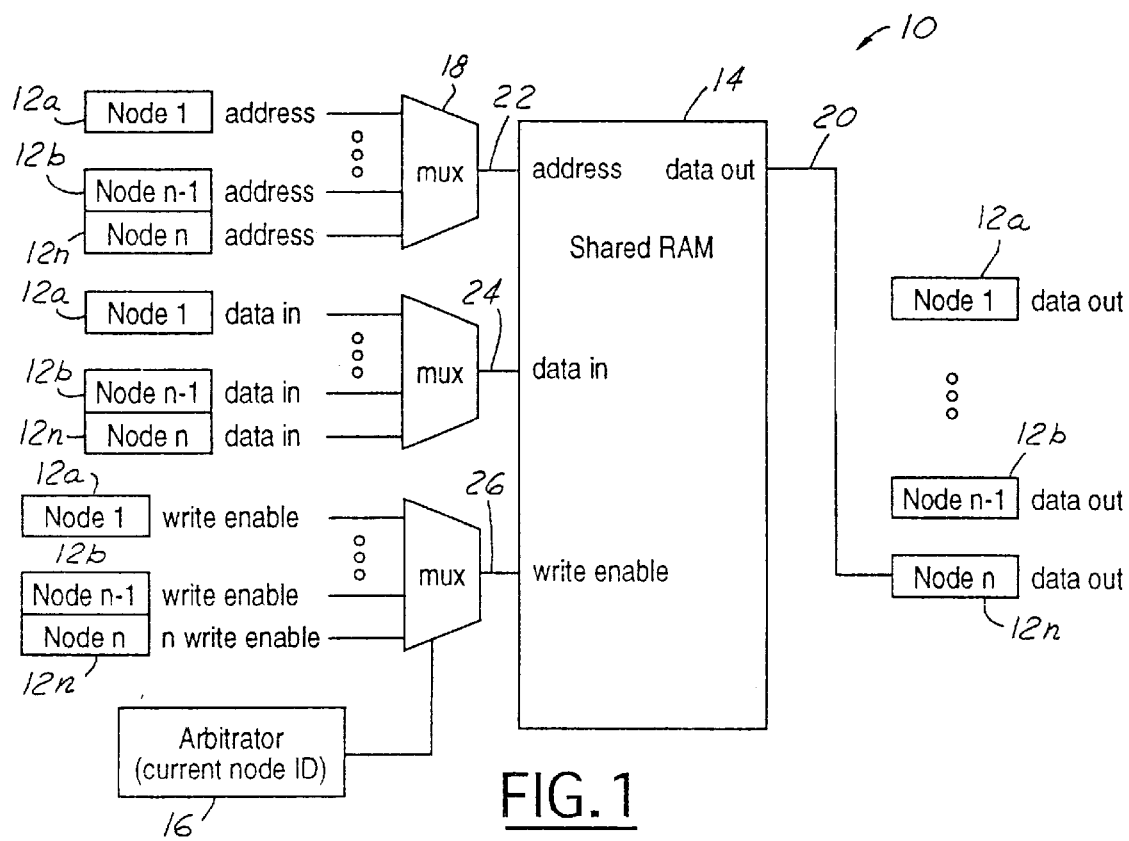
FIG. 1 illustrates a block diagram of the data processing arbitration and synchronization system in accordance with the present invention.

Referring now to FIG. 1, a data processing arbitration and synchronization system 10 in accordance with the present invention is shown. System 10 includes n processors or nodes 12a, 12b, and 12n, a memory such as random access memory (RAM) 14, an arbitrator 16, and a multiplexer 18. Each processor 12 accesses memory 14 to provide control signals to the memory. Multiplexer 18 enables a communication path between processors 12 and memory 14 for the processors to access the memory.

The control signals specify which memory location in memory 14 to access (address bus 22), whether the access is a write or a read (write enable bus 26), and the data to be written to the memory if the access is a write (data in bus 24). Arbitrator 16 is operable with multiplexer 18 to select the control signals to pass onward to memory 14 and the control signals to ignore. The corresponding operation is then executed on memory 14. In the event of a read operation, memory 14 transfers the data to be read on to a bus 20 shared by processors 12 (data out). Processor 12 which initiated the read process then registers the transferred data from bus 20.

In order to avoid a situation where multiple processors 12 attempt to access memory 14 simultaneously, arbitrator 16 employs a simple yet powerful arbitration and synchronization scheme. Arbitrator 16 is operable with processors 12 and multiplexer 18 to allot a predetermined amount of time for each of the processors to access memory 14. The predetermined amount of access time allotted for each processor 12 has a sufficient duration to allow the processor to complete all of its communication with memory 14 during a processing loop. The predetermined amount of access time is variable for each processor 12 and can be reconfigured before running programs requiring different levels or durations of communications.

Figure 2:
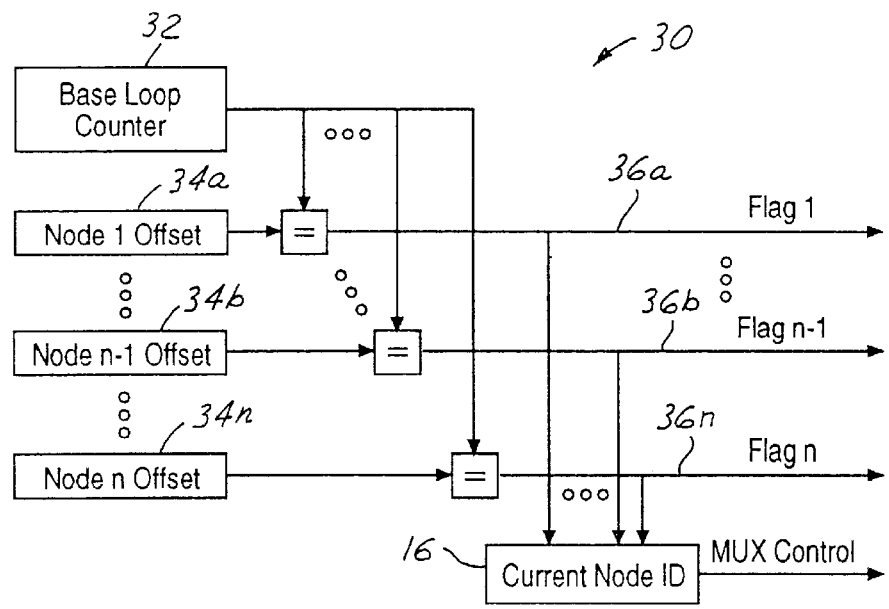
FIG. 2 illustrates an arbitration and synchronization circuit in accordance with the present invention.

Referring now to FIG. 2, an arbitration and synchronization circuit 30 in accordance with the present invention is shown. A base loop time counter 32 contains a master time frame to which all of processors 12 are synchronized. Base loop counter 32 counts clock cycles allotted for each processor 12 to access memory 14 to perform a real time processing loop. Base loop counter 32 resets to zero after reaching the amount of time allotted for the real time processing loop for all of the processors. Base loop counter 32 then counts upward to the corresponding number of clocks less one (N-1) and resets to zero again to mark the start of the next processing loop for all of the processors.

Each of processors 12a, 12b, and 12n has an associated register 34a, 34b, and 34n. Each register can be initialized from an outside interface. The number of clock cycles to delay processing by a given processor 12 on memory 14 is stored in the associated register 34. The number of clock cycles to delay the start of a processing loop for a given processor 12, i.e., offset value, is referenced with respect to base loop counter 32 being set to zero. The number of clocks counted by base loop counter 32 is compared to the offset values for each processor 12. A flag 36a, 36b, and 36n (one for each processor 12a, 12b, and 12n) is generated when the number of clocks counted by base loop counter 32 coincides with the offset value of a processor. Flags 36 are then used to initiate processing for the specified processor 12. Flags 36 identify the start of the processing loops for each processor 12.

In this way, processors 12 will stagger their processing start times relative to base loop counter 32 as specified in the offset values loaded into their respective registers 34. Each of processors 12 have a corresponding identification number (ID). Each time a flag 36 is triggered, arbitrator 16 stores the ID of the corresponding processor 12. Arbitrator 16 then uses the ID of the corresponding processor 12 as an input to the memory control select line of multiplexor 18. Multiplexor 18 then enables a communication path between the selected processor 12 and memory 14 giving the selected processor exclusive access to the control lines of the memory. Multiplexor 18 maintains the communication path between the selected processor 12 and memory 14 until the next flag 36 is triggered. Upon a new flag 36 being triggered, arbitrator 16 controls multiplexor 18 to shift control to a processor associated with the new triggered flag.

By providing processors 12 exclusive control or access of memory 14 at the start of each of their respective processing loops, all outside communication can occur up front before possible branching is required by the processing tasks of the processors. By performing the communication before branching, it is a simple task to ensure that the number of clock cycles to the last interface access is less than the number of clock cycles allotted for communication with memory 14 by a processor 12. Providing the required number of clock cycles for accessing memory 14 by a given processor 12 is ensured by comparing the difference between the offset value stored in the register 34 associated with the given processor and the next higher offset value stored in the registers associated with all of the other processors.

Because the time that each processor 12 can access memory 14 is well defined, and should not require any concurrent access arbitration, each processor is guaranteed a specific amount of time to complete the access to the memory without using wait states. Wait states reduce the amount of time available for processing and make it difficult to calculate the maximum processing time for a given program.

Figure 3:
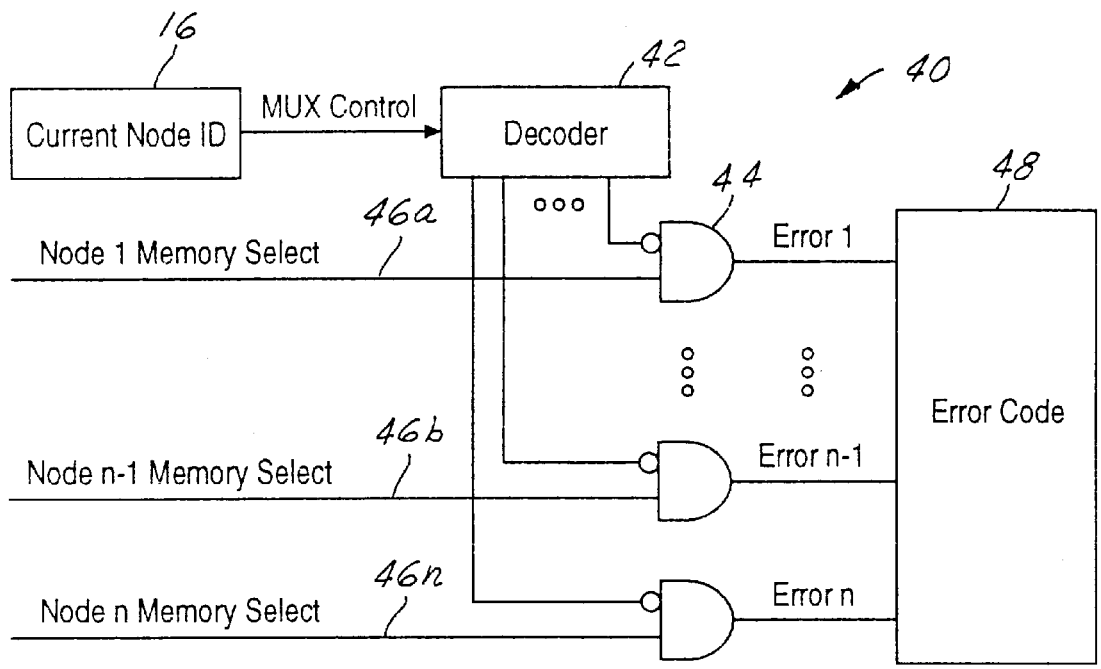
FIG. 3 illustrates an error detection circuit for detecting scheduling or initialization errors in accordance with an alternative embodiment of the present invention.

Referring now to FIG. 3, an error detection circuit 40 for detecting scheduling or initialization errors in accordance with an alternative embodiment of the present invention is shown. To detect scheduling or initialization errors, an additional control bit is added from each of processors 12. The control bits identify when the respective processors 12 are accessing memory 14 (memory select). Error detection circuit 40 detects an error if an access to memory 14 by one processor is made while arbitrator 16 has given another processor exclusive access to the memory. In response to detecting an error, error detection circuit 40 stores an error code which either indicates if an error has occurred, or which processor 12 attempted access to memory 14 out of its allotted time period.

To perform these functions, error detection circuit 40 includes a decoder 42 and combinational logic 44 to scan memory select signals 46a, 46b, and 46n and detect which processor 12 is causing the error condition. Error detection circuit 40 further includes an error code register 48 which stores a corresponding error code. An outside interface monitors error code register 48.

Figure 4:
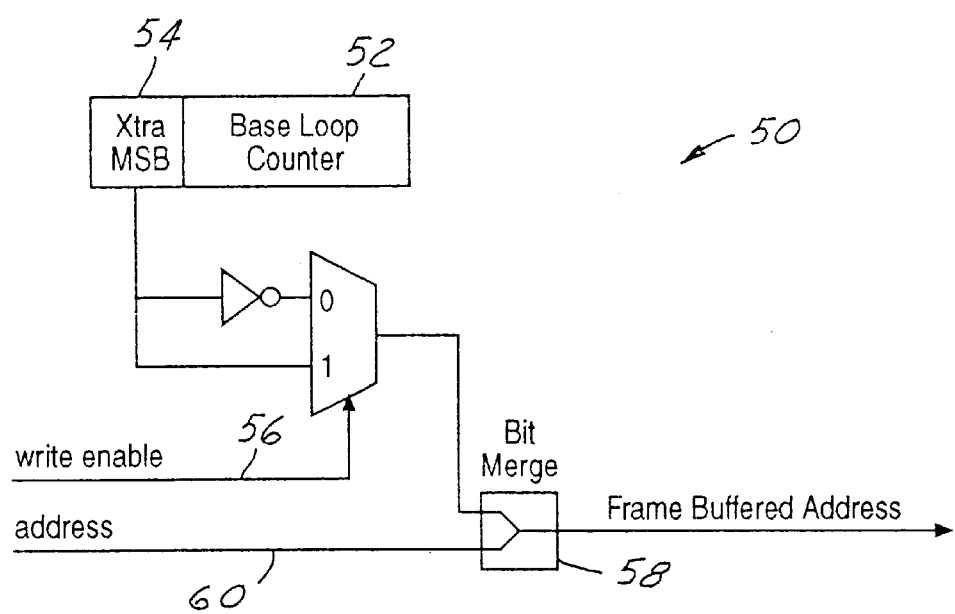
FIG. 4 illustrates a frame buffered address generator circuit for ensuring that the data from each of the processors before and after a given processor is matched in time in accordance with another alternative embodiment of the present invention.

Referring now to FIG. 4, a frame buffered address generator circuit 50 for ensuring that the data from each of processors 12 before and after is matched in time in accordance with another alternative embodiment of the present invention is shown. Because processors 12 access memory 14 in a defined time sequence, it is possible that some data in memory 14 will be updated from processors which started their processing loops before a given processor, and other data in the memory will not be updated until the processors after the given processor begin their processing loops. If it is desirable to have the data from each of processors 12 before and after a given processor to be matched in time, some adjustment needs to be done on the data.

The adjustment is to frame buffer the data. During a given processing loop or frame, all new data is written into one bank of shared memory locations which contain data written from the previous processing loop. Flag 36 indicates which bank should be accessed and is based on base loop counter 32 in order to provide a fixed time reference. Frame buffering the data provides a consistent interface and frees programmers from taking the communication order into account when writing code. The following table illustrates the concept:

| LOOP  | Bank read from | Bank written to |
|-------|----------------|-----------------|
| n     | 1              | 0               |
| n + 1 | 0              | 1               |
| n + 2 | 1              | 0               |

Frame buffering the data is most useful when the data is updated each processing loop. In cases where the data is not written each processing loop, subsequent data reads may access the data written previously to the final written value.

To perform frame buffering for ensuring that data from each of processors 12 before and after a given processor is matched in time, frame buffered address generator circuit 50 includes a base loop counter 52. Base loop counter 52 differs from base loop counter 32 by having an additional most significant bit (Xtra MSB) 54. Xtra MSB 54 is not used in the generation of loop flags 34. Xtra MSB 54 toggles with each processing loop and indicates the current bank of memory to write to or read from. Xtra MSB 54 is inverted depending upon whether the access is a read or a write as specified by the write enable bit 56 of the selected processor 12 which was granted access to memory 14. A bit merge 58 merges Xtra MSB 54 with the associated address 60 and is used to access memory 14. In this way, the banks of memory 14 are implemented in the upper and lower halves of the address space (each bank is the size of the input address space). A read and write access opposite banks of memory 14 because of the inversion of Xtra MSB 54, which during each processing loop the banks used for each type of address are swapped. As a result, data written to one bank during a processing loop will be read on the next subsequent processing loop. Data read from one bank during a processing loop and no longer required will be over written on the next processing loop.

In summary, data processing arbitration system 10 is a low cost shared memory and bus approach for multiple processors to access a shared memory which avoids the need for a complex arbitrator or the injection of wait states. Arbitrator 16 schedules the time each processor 12 can access memory 14 and ensures that each program of the processor accesses the memory only during this period of time. Because of the difficulty in tracking absolute time within a program if branches are supported in processors 12, access is limited to the beginning of the processing loop before branches are taken. The required processing time of the processing loop before branches are taken is easily defined. To fully use the bandwidth of shared memory 14 and avoid concurrent accesses, the beginning of each processor's 12 processing loop is staggered in time.

The present invention requires minimal hardware resources for multi-processor communication, and provides a simple and efficient method of synchronization which avoids the overhead and uncertainty of injecting wait states into real time processing. The need for limited hardware translates to reduced system cost compared to the prior art. The synchronization method insures a fixed latency for inter-processor communication, which means the maximum processing time can be determined and compared against the fixed allowable time resulting from the real-time environment. Additional circuitry may be added to efficiently monitor error conditions due to scheduling errors, and to implement frame buffering to minimize the complexity of the programming task for external communication.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A data processing system comprising:

memory;

a plurality of processors each operable with the memory for accessing the memory;

an arbitrator operable with the processors for enabling each of the processors exclusive access to the memory for a predetermined time period on a rotating basis;

a time loop counter operable with the arbitrator, the time loop counter counting through time values to which the predetermined time periods of exclusive access to the memory for the processors are synchronized on the rotating basis, wherein the time loop counter includes a frame buffered address generator circuit for ensuring that data communicated between the processors and the memory during the predetermined time periods of exclusive access is matched in time; and a plurality of registers each operable with the time loop counter and each associated with a respective processor, each of the registers having a predetermined offset time value, wherein the arbitrator enables a processor exclusive access to the memory for a predetermined offset time period when the predetermined time value of the register operable with the processor matches the counted time value of the time loop counter.

2. The system of claim 1 further comprising:

a multiplexer operable with the arbitrator and the processors, the multiplexer operable for enabling a communication path between a processor and the memory, wherein the arbitrator controls the multiplexer to enable a communication path between a processor and the memory to enable the processor exclusive access to the memory for a predetermined time period when the predetermined offset time value of the register operable with the processor matches the counted time value of the time loop counter.

3. The system of claim 2 further comprising:

an error detection circuit operable with the arbitrator and the multiplexer for detecting an access to the memory by a processor while another processor has exclusive access to the memory.

4. The system of claim 1 wherein:

each of the processors access the memory to perform data processing while having exclusive access to the memory.

5. The system of claim 1 wherein:

each of the processors access the memory to read data from the memory while having exclusive access to the memory.

6. The system of claim 1 wherein:

each of the processors access the memory to write data to the memory while having exclusive access to the memory.

7. A data processing system having multiple processors operable to access a shared memory, the system comprising:

an arbitrator operable with the multiple processors for allotting the multiple processors exclusive access to the shared memory for variable time periods on a rotating basis;

a time loop counter operable with the arbitrator, the time loop counter counting through time values to which the variable time periods of exclusive access to the memory for the processors are synchronized on the rotating basis, wherein the time loop counter includes a frame buffered address generator circuit for ensuring that data communicated between the processors and the memory during the predetermined time periods of exclusive access is matched in time; and a plurality of registers each operable with the time loop counter and each associated with a respective processor, each of the registers having a predetermined offset time value, wherein the arbitrator enables a processor exclusive access to the memory when the predetermined offset time value of the register operable with the processor matches the counted time value of the time loop counter.

8. The system of claim 7 further comprising:

a multiplexer operable with the arbitrator and the processors, the multiplexer operable for enabling a communication path between a processor and the memory, wherein the arbitrator controls the multiplexer to enable a communication path between a processor and the memory to enable the processor exclusive access to the memory when the predetermined offset time value of the register operable with the processor matches the counted time value of the time loop counter.

9. The system of claim 7 wherein:

each of the processors access the memory to perform data processing while having exclusive access to the memory.

* * * * *